Oct. 20, 1959    G. G. LANDIS    2,909,642
MEANS AND METHOD FOR DEEP FLUX ARC WELDING
Filed Nov. 13, 1956
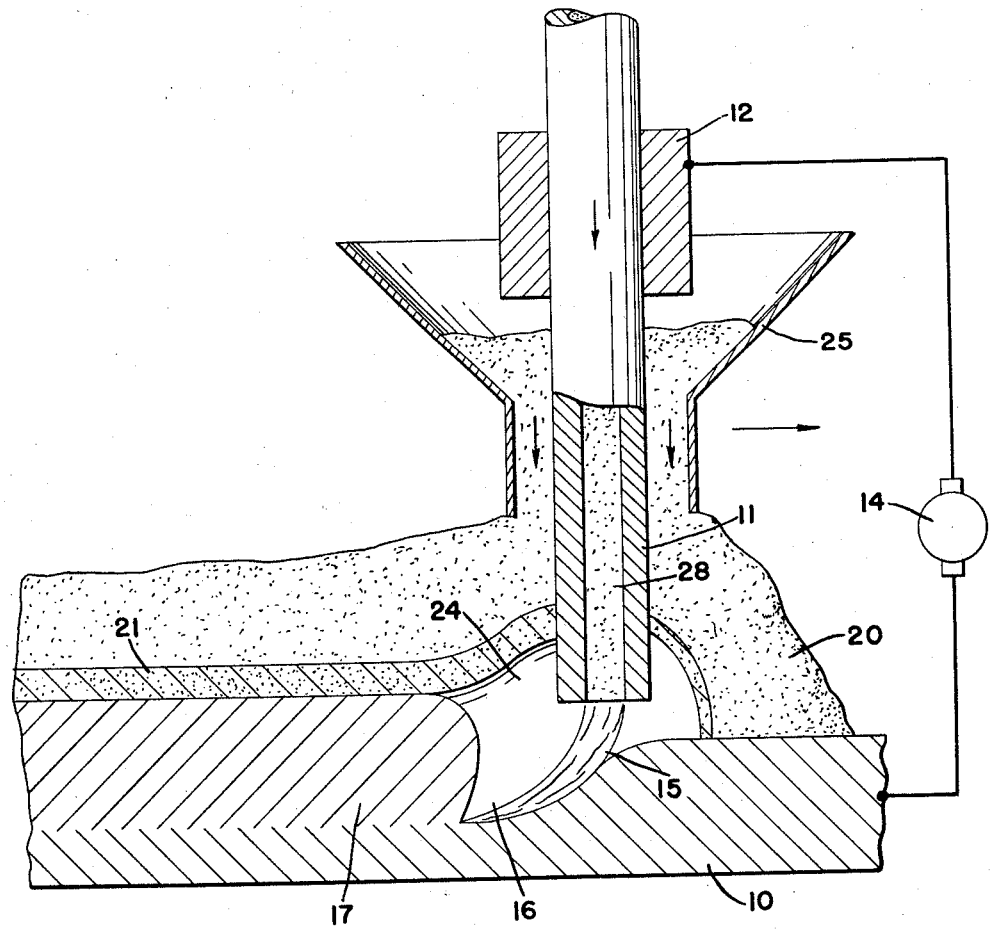
INVENTOR.
GEORGE G. LANDIS
BY
*Alfred C. Body*
ATTORNEY

United States Patent Office 2,909,642
Patented Oct. 20, 1959

2,909,642

MEANS AND METHOD FOR DEEP FLUX ARC WELDING

George G. Landis, South Euclid, Ohio, assignor to The Lincoln Electric Company, Cleveland, Ohio, a corporation of Ohio Application November 13, 1956, Serial No. 621,568

11 Claims. (Cl. 219—73)

This invention pertains to the art of electric arc welding and, more particularly to means and method for so-called deep flux or submerged arc welding.

The invention is particularly applicable to the arc welding of steel and its various alloys and will be described with particular reference to same, although it will be appreciated that the invention in many instances is equally applicable to the arc welding of the non-ferrous metals, such as, without limitation, aluminum, copper, magnesium and titanium.

In deep flux or submerged arc welding of steels, a pile of a granular fluxing material is deposited on the workpiece and thereafter a bare steel electrode is advanced through this pile of flux both lengthwise toward the workpiece and sidewardly in the desired direction of the weld, while maintaining an arc between the workpiece and the electrode end. The arc simultaneously melts a trough in the workpiece surface and the advancing electrode end. The molten metal of both is intermingled in this trough and hardens after the arc has passed. The heat of the arc also melts the fluxing material which being lighter than the molten metal floats on top thereof and protects the molten metal from the oxygen and nitrogen of the air. After the molten metal has congealed, the granular fluxing material, which has not melted, may be recovered and reused. The fluxing material which has melted, called the slag, must be removed and disposed of.

Fluxing materials, as originally employed, were a mixture of powdered ingredients, some of which produced a gas when heated in the heat of the arc. Some of this gas was evolved in the molten weld bead. For slow speed welding, the gas had sufficient time to escape from the molten weld bead before the metal congealed. As the speed of welding increased, however, such gas was trapped in the congealing weld bead and produced porous weld beads.

Subsequently, these various powdered ingredients were melted together until all gas had been evolved. The molten flux was then allowed to harden and crushed to the desired particle size. Such a flux was inert over the molden weld bead. However, it was impossible to add killing agents prior to the melting operation because they reacted with the other flux ingredients and were unavailable for functioning in the weld bead. If added to the flux ingredients after crushing to size, they tended to settle out and become non-uniformly distributed throughout the flux.

Thereafter, a flux was devised made up of a plurality of non-gas-producing fluxing ingredients and the desired killing agents were mixed together with a liquid binder and the mixture was then heated to harden the binder. Thereafter, the mixture was crushed to the desired particle size such that each particle was made up of all of the fluxing ingredients and the killing agent in uniformly distributed condition. Such a flux required slightly more expensive materials than the fused flux above discussed but proved eminently satisfactory for welding operations of the speeds above referred to because of the ability to include a killing agent. Such a flux is described and claimed in Patent No. 2,474,787 assigned to the assignee of this application.

Such fluxes have worked very satisfactorily and millions of feet of excellent welds have been produced thereby.

Such welding operations have had a recommended welding speed of 30 inches per minute for one-half inch plate, and 15 inches per minute for one-inch plate. Porosity of the deposited weld bead appeared to be the limiting factor. Thus, as higher weld speeds were attempted, porosity increased to the point where the weld bead was unsatisfactory. Such porosity became more apparent, particularly when welding under adverse conditions of a dirty workpiece caused by the presence of iron oxide, cutting oils, or the like. As the speed of welding appreciably affects the cost of the welding operation, it will be apparent that if the welding speed can be increased without the problems of porosity, that substantial savings can be accomplished.

The present invention contemplates new and improved means and method for deep flux electric arc welding, which enables solid non-porous weld beads to be obtained at higher speeds than have ever heretofore been obtainable.

Another problem with deep flux welding has been the cost of the materials which must be available at the weld zone, most of which do not appear in the weld bead and are, therefore, wasted.

For the welding of the mild or low-alloy steels, it is always necessary to supply relatively expensive metallic killing agents or deoxidizers, such as manganese or silicon which prevent what may be termed "carbon monoxide porosity." Thus, in all mild and low-alloy steels, iron oxide and carbon are present. In the molten weld pool, the carbon reduces the iron oxide to pure iron and carbon monoxide, a gas with a volume many thousands of times greater than the volume of the solid material from which it is formed. These gases are produced and trapped in the molten weld metal as it congeals and produce "carbon monoxide" porosity. However, the killing agents if present in large enough amounts react first with the iron oxide in preference to the carbon to produce pure iron and an oxide of the killing agent which is either a solid or liquid at the melting temperature of steel, and thus does not produce porosity.

Heretofore, these killing agents have been supplied to the point of the arc either by alloying them with the steel of the electrode or by adding them to the flux material. In the former case, steels containing larger than normal amounts of manganese, silicon, or the like, are considered alloy steels and are unduly expensive. In the latter case, the recovery efficiency of the killing agents is low because only a portion of the killing agents in the flux can be made to enter the molten weld metal and the remainder is wasted.

The same low efficiency of recovery is true where alloying ingredients (as described in application Serial No. 291,562, filed June 3, 1952, and assigned to the assignee of this application) are added to the weld bead by incorporating them in the flux.

A further contributing factor to the expense of fluxes for submerged arc or deep flux welding is in some of the non-metallic materials which must be employed to offset the effects of the killing agents in the flux and to protect the arc. All fluxes are a carefully blended formulation of different flux ingredients wherein, for example, a high cost ingredient must be employed to offset the undesirable characteristics of another ingredient necessarily employed for a different desirable characteristic. For example, ferro-silicon is an excellent and the cheapest killing agent. However, it tends to make the slag adhere to the deposited weld bead and thus difficult to remove. More expensive materials than would ordinarily be used are required to offset this effect.

Thus, the present invention further contemplates means and method for submerged arc or deep flux arc welding, using a bare metallic electrode wherein the flux may be either powdered, fused or powdered and bound into particles by a binder, which enables the use of cheaper fluxing ingredients, and which permits of almost 100% efficiency of recovery of the killing agents or alloying ingredients fed into the arc.

By "submerged arc" or "deep flux welding" is meant the use of a flux which is in either powdered or granular form and is deposited on the workpiece in a thick layer either in advance, or with the electrode. The flux melts in the heat of the arc and leaves a hardened layer on the surface of the deposited weld bead. By "bare" is meant an electrode having an exposed metallic surface which can be readily contacted by fixed electrical energizing means.

Without desiring to limit the invention, its success is believed based upon the following theories of operation: Iron oxide existing as a rust on the surface of steel, or the various cutting oils employed in the machining of any metals, and other foreign materials found on the surfaces of such metals, normally contain small amounts of water. In the field of submerged arc welding, the granular fluxes are somewhat hydroscopic and tend to pick up this moisture as well as moisture in the air. Also, they may contain minute amounts of materials which will produce gas in the heat of the arc.

The electric arc from the end of the electrode to the workpiece tends to bend in a direction away from the sideward movement of the electrode; that is, away from the leading edge of the trough. The movement of the molten and vaporous metal from the electrode in this direction creates a vacuum or suction into the trough and a pressure into the weld pool. This suction pulls occasional solid particles of flux from the surface of the workpiece into the weld trough and blows them rapidly toward the weld pool. These flux particles, particularly in high speed welding, to which the present invention particularly relates, are buried by the advancing molten metal before they can completely melt, thus carrying with them the moisture from the contaminants on the workpiece surface. The moisture immediately vaporizes to a volume many times greater than its liquid state volume. Even though the amount of moisture carried into the trough in this way is relatively minute, the volume of the vapor formed is sufficient to produce substantial porosity in the weld, particularly if it does not have time to escape from the molten weld pool before the molten metal hardens. It is believed that this is what happens when the welding speed is increased as is contemplated with the present invention. The arc passes a unit length of the workpiece so rapidly that the adjacent portions of the workipece are not appreciably heated and accordingly exert such a rapid chilling effect on the deposited weld bead that gas in the bead does not have time to escape, or the gas pockets formed do not have a chance to close before the metal congeals.

In view of the above, it was reasoned that if a substance could be introduced directly into the arc along with the electrode which would produce an expanding force equal to, or in excess of, the vacuum effect produced by the arc, that the sucking of the flux particles into the weld trough could be prevented and that the porosity above referred to, could thus be prevented. Tests indicated that this is the case.

Thus, in accordance with the invention, a method of submerged arc or deep flux welding is provided wherein a bare electrically energized electrode is advanced both lengthwise towards a workpiece through a pile of flux and sidewardly in the desired direction of the weld bead while, at the same time, introducing directly into the arc along with the electrode a substance, or substances, capable of vaporizing in the heat of the arc and in such amounts that the volume of the vapor produced is sufficient to offset the arc vacuum tending to suck the flux particles into the weld trough.

Such substances will hereinafter be jointly referred to generally as "vapor producing agents." Such vapor producing agents must have generally the following characteristics: (1) a boiling temperature close to, but preferably below, the melting temperature of the metal being deposited, (2) a boiling temperature above room temperature, (3) an inertness relative to the electrode metal so as not to form a compound which is a gas below the melting temperature of the metal, or does not break down into such materials or compounds, and (4) a stability in the heat of the arc so as not to break down and produce hydrogen, oxygen or nitrogen and, in the case of steel, carbon.

Thus, with steel, if carbon is produced, it will tend to cause carbon monoxide porosity. If oxygen is produced, it will react with the carbon in the weld bead to cause carbon monoxide porosity with the same results. If nitrogen is produced, it will react with various killing agents normally employed such as silicon to produce silicon nitride, which is then carried into the weld bead, and the silicon preferring the oxygen of the iron oxide will reduce the iron thus releasing nitrogen as a gas in the weld bead. Hydrogen produces weld brittleness and/or porosity.

While there are undoubtedly many substances which will meet the above requirements, tests have indicated that many of the halides of the alkali and alkaline earth metals do actually work satisfactorily and consideration of the indicated characteristics of the other halides of the alkali and alkaline earth metals indicates that they will generally also function so long as they meet the above requirements. With steel, aluminum fluoride also appears to be satisfactory.

One of the possible explanations of the success of the use of vapor producing agents may be obtained from a consideration of the temperature gradients from the center of an electric arc outwardly to the atmosphere. Thus, in any arc there will be a central core which is at, or above, the boiling temperature of the electrode metal. Outwardly from this core, the temperature decreases rapidly and if selected isothermals are plotted, there will be found a plurality of concentric cones of decreasing temperature outwardly of the core.

During welding, droplets of molten metal are continuously formed on the electrode end and move through the core to the weld pool. Additionally, the vapor producing agent which is simultaneously introduced into the arc is heated to the boiling temperature and the resultant vapors expand outwardly from the central core through the isothermal cones. It is this expansion from the core of the arc which offsets the vacuum effect of the arc above referred to. Thus, there is no tendency to draw into the weld trough any particles of flux with contaminants which form gases below the melting temperature of the metal.

As the vapors move outwardly, they condense and their volume collapses. In effect, there is a plurality of concentric sheaths of finely divided molten particles which surround the arc and impede the movement outwardly of other vapors while, at the same time, impeding the movement of any solid particles inwardly into the arc.

If these theories are correct, then the selection of the vapor producing agent should be based on (1) the volume of vapor produced per pound of agent, and (2) the diameter of the cone of condensing vapors which, in effect, is the condensing temperature of the agent. Thus, materials of lower density will produce large volumes of vapor for a given weight and are preferred, providing that the condensing temperature is sufficiently close to the molten temperature of the metal being welded that the overall cone produced by the agent does not have an excessive volume.

Other factors covering the selection of a vapor producing agent are (1) toxicity of the fumes resulting from any dissociation of the agent in the heat of the arc, (2) the deliquescent, or hydroscopic, characteristics, and (3) the cost.

Toxicity does not effect the ability of the vapor producing agent to perform its function, but does render the material undesirable for use in general welding. If proper ventilation is used, materials having high toxicity can be employed.

Hydroscopic, or deliquescent, characteristics of the vapor producing agent do not effect the ability of the material to produce a vapor, but do result in an extreme and undesirable tendency to pick up moisture when standing for even short times exposed to the atmosphere. Moisture in any form in the vicinity of the arc is undesirable. Thus, materials having hydroscopic characteristics, when considered alone, are not preferred, but if means can be provided to prevent these materials from coming into contact with moisture, they may be successfully employed.

The cost per pound of any ingredient which goes into an industrial process is also something which will effect whether the particular ingredient is a preferred ingredient or not. Thus, lithium fluoride is a preferred vapor producing agent for steel from a functional standpoint but its high cost at the time of the invention makes it impractical to employ in conventional industrial welding operations, even though less weight of material is required.

With these factors in mind, the vapor producing agent may be introduced into the arc in a variety of different forms, such as, in the form of a pure halide of an alkali metal or alkaline earth metal, or as a mixture of two or more. In this latter case, the melting and solidification temperature will be substantially reduced while the boiling temperature of each remains essentially the same.

Alternatively, the vapor producing agent may be introduced in the form of a double halide such as, without limitation, potassium silico-fluoride, sodium silico-fluoride, or potassium titanium-fluoride. These materials all have the characteristic of being able to break down in the heat of the arc to form a material which will vaporize as required in accordance with the invention and a gas which, in some cases, may be considered desirable. Thus, production of the gas increases the arc force and increases the penetration of the workpiece. Furthermore, the formation of the gas may, in some instances, assist in increasing the expanding force of the vapor producing material and further assist in keeping the flux particles from being sucked into the weld.

Mixed halides such as, without limitation MgClBr, or the like, are also within the scope of the invention.

It is also possible to use two or more compounds capable of reacting in the heat of the arc to form a halide within the scope of the invention, such compounds, without limitation, and their reaction being as follows:

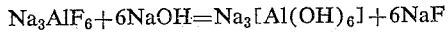
$Na_3AlF_6 + 6NaOH = Na_3[Al(OH)_6] + 6NaF$

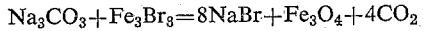
$Na_2CO_3 + Fe_3Br_8 = 8NaBr + Fe_3O_4 + 4CO_2$

In the latter case, the production of the gas may be somewhat undesirable unless small amounts are employed.

By using such double halides, mixed halides or compounds, which will form the desired halide in the heat of the arc, undesirable characteristics of the plain halide such as the deliquescense or hydroscopic characteristics or high cost, can be readily overcome or mitigated.

The amount of vapor producing agent required per pound of electrode will, of course, depend somewhat upon the type of flux employed but additionally will vary primarily by the volume of vapor produced at the arc temperatures. As indicated, lower density materials are able to produce larger volumes of gas for a given weight and are thus preferred.

Generally, the amount of vapor producing agent will be the minimum required, which minimum for the various materials indicated are generally as indicated for the following metals being welded:

| | Percent |
|---|---|
| Iron | ¾–1 |
| Aluminum | 25 |

It is to be noted that many of the materials above indicated as being operable in accordance with the invention are often employed as fluxing materials. In accordance with the invention, it is not sufficient that these materials simply be present in the fluxing material deposited upon the workpiece, but must be introduced directly and additionally into the arc such that they will be vaporized in the core of the arc and the resultant vapors can then move outwardly from the core to create a force to offset the vacuum effect of the arc force. In this respect it is believed that the vapor producing agent, or agents, may be fed into the arc along with the electrode in any desired manner, such as where practical, coated on the electrode surface or contained in recesses in the surface, or, more preferably and in accordance with a more limited aspect of the invention, in a cavity, or cavities, on the inside of the electrode. Thus, preferably, the electrode is a hollow tube of the desired weld metal filled with the vapor producing agent.

In the examples to be given herein, the weights of materials will be based on the use of a hollow tube.

As indicated above, in the welding of steels, it has always been necessary to provide a killing agent or deoxidizer which will prevent carbon monoxide porosity. As the vapor producing agents exclude the flux from the arc, such killing agents or deoxidizers must be introduced independently thereof. Thus, further in accordance with the invention, one or more killing agents or deoxidizers are fed into the arc on the interior of the hollow steel electrode along with the vapor producing agents indicated.

By "killing agents" is means a metal having a greater affinity for oxygen than does either iron or carbon, and may be selected from the class consisting of hafnium, lanthanum, the metals of the lanthanide series, zirconium, yttrium, scandium, beryllium, titanium, boron, aluminum, silicon, barium, calcium, magnesium, strontium, fluorium, actinium, lithium, neptunium, plutonium, radium, uranium, or the alloys thereof. Such agents must be present in minimum amounts of ½% to 1%. Amounts in excess of this are either wasted or result in alloying of the weld bead, depending on what is desired.

By "deoxidizers" is meant metals having a greater affinity for oxygen than does iron, but less than does carbon, and may be selected from the class consisting of manganese, chromium, niobium, tantalum, gallium and vanadium. These materials assist in the killing agent function and also impart alloying characteristics as desired. Normally, at least one of these is employed in amounts greater than ½%.

Obviously, these metals may be fed into the arc either as metals, ferro alloys, or as alloys of themselves. It is preferred to use manganese, chromium, vanadium, titanium, aluminum and silicon because of their availability and relatively low cost.

Further, in accordance with the invention, the hollow electrode may contain any amounts of alloying ingredients as ordinarily employed in the manufacture of steel, such as chromium, vanadium, manganese, silicon, nickel, arsenic, copper, columbium, or the like, either as metals, ferro alloys, or as alloys of themselves. Also, materials like chromium oxide, nickel oxide may be introduced with materials having a higher affinity for oxygen, e.g. the killing agents which reduce the oxides to the basic metal. Because of the very high recovery rate of these elements in the weld bead, it is possible to predict almost exactly the alloy of the deposited weld bead. Carbon may also be included as an alloying ingredient.

Powdered metal, the same as that of the electrode, may be contained in the tube.

It will be noted that for mild steels, a hollow electrode containing ingredients similar to those set forth above is described in the co-pending application of George G. Landis, et. al., Serial No. 594,918 and assigned to the assignee of this application, with the single exception that the vapor producing agents herein are referred to in that application as "killing agent protectors." Thus, in accordance with this application, the killing agent protectors may also perform a secondary function of producing an outwardly expanding vapor to prevent extraneous materials from being sucked into the arc.

Further, the electrodes as described in the co-pending applications of George G. Landis, et al., entitled "Means and Method for Bare Electrode Welding," Serial No. 621,650 filed November 13, 1956, to George G. Landis, et al., entitled "Means and Methods for Bare Electrode Welding of Alloy Steels," Serial No. 621,565 filed November 13, 1956, both filed concurrently herewith may be employed.

Oxide solvents as described in all these three applications may also be employed. Silicon dioxide is preferred for steel.

In some respects, the present invention contemplates the welding with deep flux using the electrodes of these applications. However, the deep flux, in accordance with the present invention, performs a different function than has heretofore been ascribed to it. Thus, in accordance with one aspect of the present invention, a hollow electrode containing sufficient ingredients on the inside thereof so as to deposit a solid, non-porous weld bead in air is employed in conjunction with a material whose sole function is to form a molten layer over the deposited molten weld bead, assist in shaping the weld bead as it hardens, and protect the hardening molten metal from the atmosphere after the arc with its protective cone of killing agent protectors, or vapor producing agents, has passed therebeyond.

Using the present invention, it has been found possible to use fluxes which heretofore have been considered unsatisfactory for welding purposes and, in particular, fluxes which will produce a gas in the heat of the arc. As the expanding vapor producing agents of the present invention completely exclude any of the flux material in the unmelted form from getting into the molten weld bead, no gases can be produced in the molten weld bead as a result of the flux.

As an example, a flux consisting of calcium magnesium-carbonate, partly sintered to drive off some but not all of the $CO_2$, mixed with powdered sand, has been successfully employed. Calcium magnesium carbonate is cheaper than sand, which heretofore has been the cheapest ingredient of any welding flux. It is to be pointed out that the giving off of a gas by the fluxing material is not too serious a problem when used in accordance with the present invention. The particular flux formulation employed forms no part of the present invention.

The prime requirements of the flux in accordance with the present invention is that it have a boiling temperature above and a freezing temperature below the freezing temperature of the metal being deposited and that it does not adhere too tenaciously to the deposited weld bead upon hardening.

It is also to be noted that using the present invention, all of the killing agents, deoxidizers, or alloying ingredients contained in the electrode enter into and function in the weld bead. This is to be particularly distinguished from where the killing agents and/or deoxidizers and/or alloying ingredients are mixed in with the flux where only a small recovery of these agents in the weld bead can be expected and any remaining in the slag are wasted.

Further, in accordance with the invention, there is provided means for electric arc welding, comprising, in combination: a granular or powdered flux, means for feeding such flux towards a workpiece, an electrode containing a vapor producing agent, which will expand in the heat of the arc to offset the vacuum effect of the arc and means for feeding such electrode toward the workpiece through the pile of flux and along the workpiece in the desired direction of the weld.

The principal object of the invention is the provision of a new and improved means for electric arc welding which is simple in construction, easily operated and which enables the production of higher speed welds than have ever heretofore been accomplished.

Another principal object of the invention is the provision of a new and improved method of electric arc welding which is simple, economical and enables the production of high speed non-porous weld beads.

Another object of the invention is the provision of a new and improved method of electric arc welding which offsets the pumping action of the electric arc and prevents the sucking of flux particles into the weld trough.

Another object of the invention is the provision of a new and improved method of deep flux or submerged arc welding wherein killing agents, or alloying ingredients, are fed into the weld pool on the inside of the electrode and the flux protects the weld from the atmosphere and assists in shaping the weld bead.

Another object of the invention is the provision of a new and improved method of deep flux or submerged arc electric arc welding which enables the use of cheaper fluxes while still providing good, solid, non-porous weld beads.

Another object of the invention is the provision of a new and improved method of electric arc welding wherein a substantial 100% recovery of killing agents, or alloying ingredients, fed into the arc may be obtained.

Another object of the invention is the provision of a new and improved method of electric arc welding wherein it is unnecessary to mix killing agents with the flux.

Another object of the invention is the provision of a new and improved electrode for submerged arc or deep flux arc welding which enables extremely high speed, non-porous weld beads to be obtained.

The present invention may take physical form in a number of different appearing steps, and combinations of steps, and parts and combinations of parts, preferred embodiments of which will be described in the specification and illustrated in the accompanying drawing which is a part hereof and wherein the single figure illustrates somewhat schematically arc welding means embodying the present invention.

Referring now to the drawings wherein the showings are for the purposes of illustrating a preferred embodiment only and not for the purpose of limiting same, there is shown an electrode 11 being advanced lengthwise towards and sidewardly relative to a workpiece 10 to be welded. The electrode 11 is of bare metal and is electrically energized by contact blocks 12 in fixed spaced relationship to the workpiece 10 and electrically energized from a welding generator 14 connected to the block 12 and to the workpiece 10 as shown. An arc 15 between the end of the electrode 11 and the workpiece 10 cuts a trough 16 in the workpiece and the metal melted from this trough, together with the metal from the end of the electrode 11 are intermingled in a molten weld bead 17 which hardens as it cools to form the deposited weld bead. A pile 20 of fluxing material is deposited upon the upper surface of the workpiece 10 in advance of the sideward movement of the electrode 11 and melts in the heat of the arc to form a molten layer 21 completely covering over the weld bead 17 and a hollow cavity 24 about the electrode end and the leading edge of the molten weld pool 17.

The flux 20 is deposited on the workpiece 10 through a flux hopper 25 shown arranged coaxially about the lower end of the electrode 11 with its lower end spaced from the workpiece 10. The spacing of the lower end of the hopper 25 adjusts the amount of flux which will be deposited on the workpiece.

The electrode 11 is in the form of a hollow tube of the desired metal to be deposited and contains a plurality of ingredients 28 on the interior thereof in accordance with the present invention.

The material 28, in accordance with preferred embodiments, and for the welding of steel, is as described in the preferred embodiments of the co-pending application of George G. Landis, et al., Serial No. 594,918, filed June 29, 1956. The composition of the material 28 in a preferred embodiment for the welding of non-ferrous metals is as described in the copending application filed concurrently herewith entitled "Method and Means for Bare Electrode Welding."

In any event, one or more of the ingredients contained on the inside of the hollow tube of the electrodes described in these applications will vaporize in the heat of the arc to provide an expanding force tending to prevent the arc force from sucking the flux material 20 into the weld trough 16.

In some instances, it will be noted that the ingredients include materials which will produce a gas in the heat of the arc. By a "gas" is meant a material having a boiling temperature below room temperature. The production of such gases is not detrimental if produced in sufficiently small amounts. The use of a gas is desirable in some instances as it assists the arc in penetrating into the workpiece. By varying the amount of gas producing material, the amount of penetration can be readily controlled.

The flux 20 and its composition forms no part of the present invention. It may be in either a finely powdered or granular form. Preferably, it is in a granular form and may have the composition of the flux described in U.S. Patent No. 2,719,801, dated October 4, 1955, and assigned to the assignee of this application, or as described in Patent No. 2,474,787, dated June 28, 1949, and assigned to the assignee of this application.

Generally, the flux employed must have an inertness to molten steel and must have a solidification temperature below the melting temperature of molten steel. The flux composition is primarily formulated on the basis of providing a satisfactory weld bead shape, and so as to be easily removable. Because the invention keeps the flux particles from being drawn into the molten weld bead, the formation of gases by the flux in the heat of the arc is not particularly detrimental.

By using the invention, extremely high welding speeds, using deep flux or submerged arc, can be obtained without the dangers of porosity heretofore present in this type of welding.

The invention has been described with reference to preferred embodiments. Obviously, modifications and alterations will occur to others upon a reading and understanding of this specification, and it is our intention to include all such modifications and alterations insofar as they come within the scope of the appended claims, or the equivalent thereof.

Having thus described my invention, I claim:

1. A method of deep flux or submerged arc welding, comprising: the steps of depositing a layer of welding flux on the surface of a workpiece and advancing an electrically energized electrode through such layer of flux while maintaining an arc between the electrode end and the workpiece so as to deposit a weld bead; the improvement which comprises: introducing into the arc simultaneously with the electrode and independently of the welding flux a substance capable of vaporizing in the heat of the arc and in such amounts that the volume of vapor produced is sufficient to offset the arc vacuum tending to suck the flux particles into the weld trough.

2. The method of claim 1 wherein the substance has a boiling temperature close to the melting temperature of the metal being deposited, a boiling temperature above room temperature, an inertness relative to the electrode metal so as not to form a compound which is a gas below the melting temperature of the metal or does not break down into such materials or compounds, and a stability in the heat of the arc so as not to break down and produce hydrogen, oxygen or nitrogen, and, in the case of welding steel, carbon.

3. The method of claim 1 wherein the substance is selected from one or more of the class consisting of the halides of the alkali and the alkaline earth metals and aluminum, having a boiling temperature close to, but preferably below, the melting temperature of the metal being deposited.

4. The method of claim 1 wherein the substance is selected from one or more of the class consisting of the halides of the alkali and alkaline earth metals, aluminum fluoride, and materials capable of breaking down in the heat of the arc, or of combining in the heat of the arc and forming such halides.

5. The method of claim 1 wherein the electrode is a hollow tube and the substance is introduced into the heat of the arc on the inside of the hollow tube.

6. A method of submerged arc, or deep flux welding of the type wherein a bare electrically energized electrode is advanced towards a workpiece through a pile of flux while maintaining an arc between the end of the electrode and the workpiece; the improvement which consists in introducing into the core of the arc a halide of the alkali and alkaline earth metals and aluminum, or compounds containing both a halogen and an alkali or alkaline earth metal or aluminum which will break down in the heat of the arc and form a halide of the alkali and alkaline earth metals or aluminum.

7. A method of submerged arc, or deep flux welding of the type wherein a bare electrically energized electrode is advanced both lengthwise toward the workpiece through a pile of flux and sidewardly in the desired direction of the weld bead; the improvement which consists in introducing into the arc independently of the flux, one or more killing agents selected from the class consisting of hafnium, lanthanum, the metals of the lanthanide series, zirconium, yttrium, scandium, beryllium, titanium, boron, aluminum, silicon, barium, calcium, magnesium, strontium, fluorium, actinium, lithium, neptunium, plutonium, radium, uranium, or the alloys thereof in minimum amounts of ½%, one or more deoxidizers selected from the class consisting of manganese, chromium, niobium, tantalum, gallium and vanadium in minimum amounts of ½%, and one or more vapor producing agent selected from the class consisting of the halides of the alkali, the alkaline earth metals and aluminum or mixed or double halides of the alkali, the alkaline earth metals and aluminum which will break down the heat of the arc to produce a halide of the alkali, the alkaline earth metals and aluminum in minimum amounts of ¾%.

8. The method of claim 7 wherein the substances also include one or more alloying ingredients selected from the class consisting of chromium, vanadium, manganese, silicon, nickel, arsenic, copper, columbium, or the like, either as metals, ferro alloys, or as alloys of themselves in desired amounts to impart to the deposited weld bead a prescribed alloying content.

9. Means for electric arc welding comprising, in combination: a flux hopper, a fluxing material in said hopper adapted to be deposited upon a workpiece, a welding electrode, means for electrically energizing said electrode relative to a workpiece and means for feeding such electrode towards a workpiece, said electrode being hollow and containing on the inside thereof one or more materials selected from the class consisting of the halides of the alkali or the alkaline earth metals and aluminum which have a boiling temperature close to the boiling temperature of the electrode metal, and one or more killing agents selected from the class consisting of hafnium, lanthanum, the metals of the lanthanide series, zirconium, yttrium, scandium, beryllium, titanium, boron, aluminum, silicon, barium, calcium, magnesium, strontium, fluorium, actinium, lithium, neptunium, plutonium, radium, uranium, or the alloys thereof.

10. The combination of claim 9 wherein the materials on the inside of said electrode also include a deoxidizer selected from the class consisting of manganese, chromium, niobium, tantalum, gallium and vanadium.

11. The combination of claim 9 where the materials on the inside of said electrode include one or more alloying ingredients selected from the class consisting of chromium, vanadium, manganese, silicon, nickel, arsenic, copper, columbium, or the like, either as metals, ferro alloys, or as alloys of themselves in desired amounts to impart to the deposited weld bead a prescribed alloying content.

References Cited in the file of this patent

UNITED STATES PATENTS

| | | |
|---|---|---|
| 1,358,311 | Harris | Nov. 9, 1920 |
| 2,043,960 | Jones | June 9, 1936 |
| 2,151,914 | Hopkins | Mar. 28, 1939 |
| 2,402,165 | Kinkead | June 18, 1946 |
| 2,497,629 | Rieppel | Feb. 14, 1950 |
| 2,694,023 | Hopkins | Nov. 9, 1954 |
| 2,766,360 | Landis et al. | Oct. 9, 1956 |